(12) United States Patent
Yu et al.

(10) Patent No.: US 7,631,195 B1
(45) Date of Patent: *Dec. 8, 2009

(54) SYSTEM AND METHOD FOR PROVIDING SECURITY TO A PORTABLE STORAGE DEVICE

(75) Inventors: I-Kang Yu, Palo Alto, CA (US); Charles C. Lee, Cupertino, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 716 days.

This patent is subject to a terminal disclaimer.

(21) Appl. No.: 11/377,235

(22) Filed: Mar. 15, 2006

(51) Int. Cl.
*G06F 21/00* (2006.01)
*H04L 9/00* (2006.01)
*H04K 1/00* (2006.01)

(52) U.S. Cl. ........................ 713/189; 713/179
(58) Field of Classification Search .................. None
See application file for complete search history.

(56) References Cited

U.S. PATENT DOCUMENTS

| 4,558,176 | A * | 12/1985 | Arnold et al. ............... 713/190 |
| 6,067,621 | A * | 5/2000 | Yu et al. ..................... 713/172 |
| 6,550,011 | B1 | 4/2003 | Sims, III |
| 7,269,258 | B2 * | 9/2007 | Ishihara et al. ............. 380/263 |
| 7,478,248 | B2 * | 1/2009 | Ziv et al. .................... 713/193 |
| 2004/0103288 | A1 | 5/2004 | Ziv et al. |
| 2004/0139028 | A1 * | 7/2004 | Fishman et al. .............. 705/67 |
| 2006/0129797 | A1 * | 6/2006 | Durfee et al. ................. 713/2 |
| 2007/0198861 | A1 * | 8/2007 | Minami et al. ............. 713/194 |
| 2007/0234421 | A1 * | 10/2007 | Ogino et al. ................ 726/19 |

* cited by examiner

*Primary Examiner*—Christopher A Revak
(74) *Attorney, Agent, or Firm*—Bever, Hoffman & Harms, LLP; Patrick T. Bever (57) ABSTRACT

A system for providing security to a portable storage device coupleable to a host system and associated methods are disclosed. The system includes a portable storage device random number generator operable to generate a random number for storage in the portable storage device and the host system each time the portable storage device is accessed by the host system. A random number generated in this manner may be used by the host system in a write process to encrypt a logical branch address, a user password, and user data which may be written to the portable storage device as encrypted data and stored in a secure area of the portable storage device. The write process may further include encrypting the random number using a key associated with the portable storage device to generate an encrypted random number, which may be written to the portable storage device and associated with the encrypted data. The random number is not stored in the host system. A new random number may be generated each time the portable storage device is queried. In a read process the host system may decrypt the encrypted random number associated with the encrypted data to be read using the key associated with the portable storage device to generate the random number. The read process may further include using the random number to decrypt the associated encrypted data. Access to read/write processes may be password protected.

20 Claims, 12 Drawing Sheets

SYSTEM AND METHOD FOR PROVIDING SECURITY TO A PORTABLE STORAGE DEVICE

BACKGROUND OF THE INVENTION

The present invention generally relates to portable storage devices and more particularly to a system and method for providing security to a portable storage device.

As the number of mobile, portable, and handheld devices grows, the popularity of flash memory used as a portable storage device increases. The most common type of flash memory is in the form of a removable memory card such as a USB card. Removable cards allow the contents of the flash memory to be transferred easily between devices or computers. As such, the contents of flash memory can easily be accessed by unauthorized users unless such content is protected from unauthorized access.

A system and method for providing protection of content which may be transmitted over unsecured channels, including storage and transmission in bulk media, is disclosed in U.S. Pat. No. 6,550,011 entitled "Media Content Protection Utilizing Public Key Cryptography". In order to store a content key within a secure area of a storage device, the disclosed method identifies a secure area within the storage device to associate with a particular protected content. A storage device public key and certificate are then obtained and sent to an originator device. Next a random number encrypted with a storage device secret key is obtained by the originator device. The content key is then exclusive ORed with the random number at the originator device. The use of the random number prevents the replay of the conversation to another storage device sharing the same public secret key set from establishing a useful copy of the content. Further, the user of the random number from the storage device may be relied upon to add an extra layer of security to the transfer of the content key. The disclosed system and method disadvantageously utilizes public key cryptography which is costly and time consuming.

A portable storage device having a microprocessor and a secure user data area is disclosed in U.S. Patent Application Publication No. 2004/0103288 entitled "Apparatus and Method for Securing Data on a Portable Storage Device". The apparatus disclosed includes a secure portable storage device for securing user data under a user password, the portable storage device being connectable to a host device. The host device is operable to selectably send data to be written onto the portable storage device and receive data read from the portable storage device. The secure portable device includes a storage medium including a secure user area and a microprocessor operable to exclude access from the host device to the secure user area unless the user password is provided to the microprocessor. A method for securing data on the portable storage device includes a step in which the microprocessor randomly generates a clear key of a preferred length under well-known random-generation techniques. The clear key becomes a permanent encryption key for all data stored in the secure user area. The disclosed system and method disadvantageously sends unencrypted data to be written onto the portable storage device and receives unencrypted data read from the portable storage device.

Therefore, there is a need for a system and method for providing security to a portable storage device that overcomes the disadvantages of the prior art. What is needed is a system and method for providing security to a portable storage device that does not rely on public key cryptography. What is further needed is a system and method for providing security to a portable storage device that does not send or receive any unencrypted data between the host system and the portable storage device. What is further needed is a system and method for providing security to a portable storage device that generates a random number each time the portable storage device is queried by the host system, the random number being used by the host system to encrypt data stored in the portable storage device and being encrypted using a key unique to the portable storage device and stored in the portable storage device. What is also needed is a system and method for providing security to a portable storage device that enables the host system to decrypt the random number in order to decrypt encrypted data read from the portable storage device. What is also needed is a system and method for providing security to a portable storage device having an address transform between the host system and the portable storage device.

SUMMARY OF THE INVENTION

In accordance with one aspect of the invention, a system for providing security to a portable storage device coupleable to a host system includes a portable storage device random number generator operable to generate a random number each time the portable storage device is accessed by the host system. A first host system encryption engine is operable to encrypt a password, a logical block address and data using the random number, the encrypted password, encrypted logical block address and encrypted random number being stored in a secure area of the portable storage device. A second host system encryption engine is operable to encrypt the random number using a key to generate an encrypted random number, the encrypted random number being stored in the secure area of the portable storage device. A first host system decryption engine is operable to decrypt encrypted data received from the portable storage device using the random number provided by a second host system decryption engine, the second host system decryption engine generating the random number from the encrypted random number received from the portable storage device. A portable storage decryption engine is operable to decrypt the encrypted password and logical block address and generate an unencrypted password and unencrypted logical block address.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended herein.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These and other features, aspects, and advantages of the present invention will become better understood with reference to the following drawings, description, and claims.

DETAILED DESCRIPTION OF THE INVENTION

The present invention provides, in a preferred embodiment, for a system and method for providing security to a portable storage device that includes a portable storage device random number generator operable to generate a random number each time the portable storage device is queried by a host system. A random number generated in this manner is used by the host system in a write process to encrypt a logical branch address, a user password, and user data which is written to the portable storage device as encrypted data and stored in a secure area of the portable storage device. The write process further includes encrypting the random number using a key associated with the portable storage device to generate an encrypted random number, which is written to the portable storage device and associated with the encrypted data. The random number is not stored in the host system. A new random number may be generated each time the portable storage device is queried.

In a read process the host system decrypts the encrypted random number associated with the encrypted data to be read using the key associated with the portable storage device to generate the random number. The read process further includes using the random number to decrypt the associated encrypted data. Access to read/write processes may be password protected.

Figure 1:
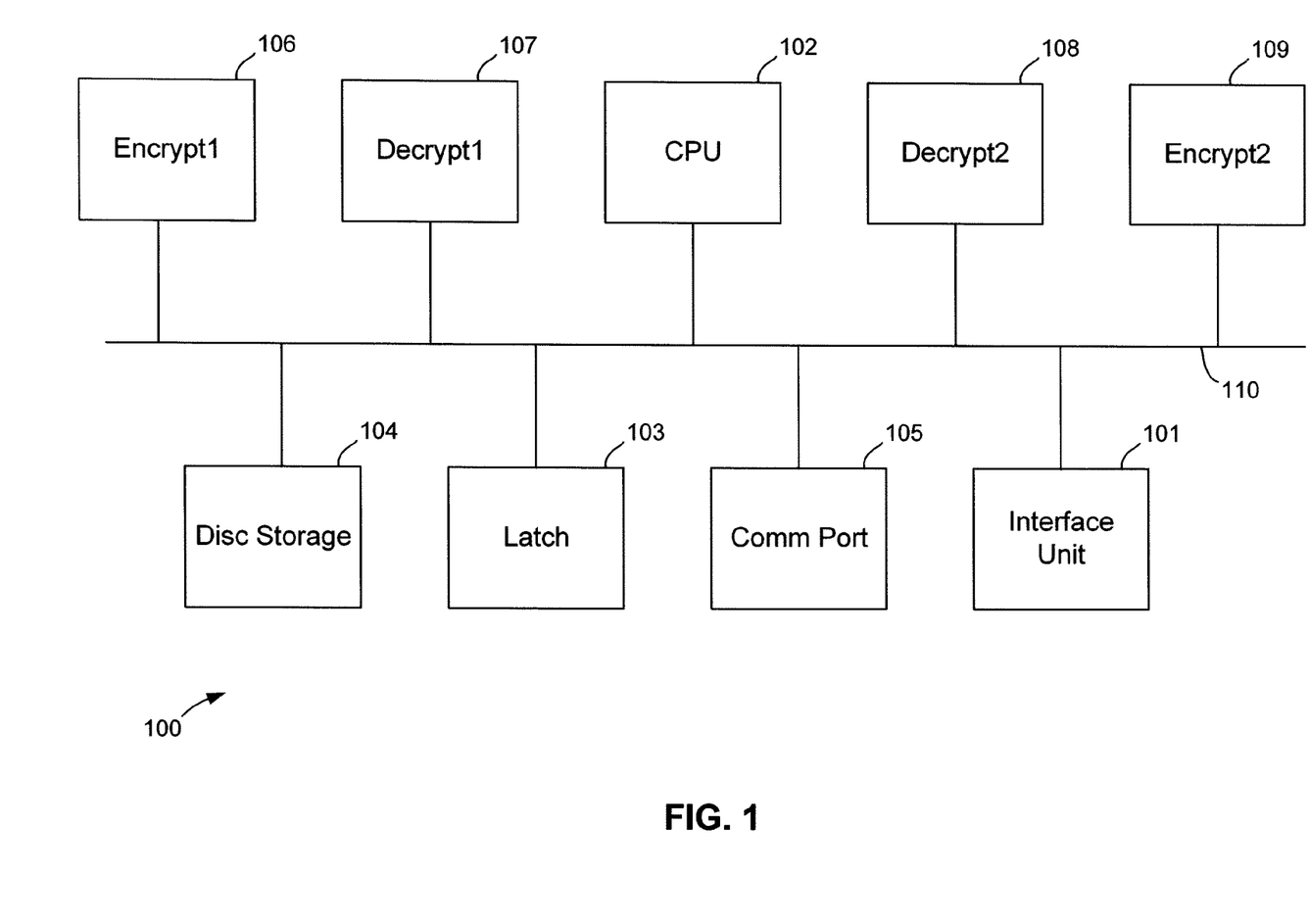
FIG. 1 is a schematic representation of a host system in accordance with the present invention.
Figure 2:
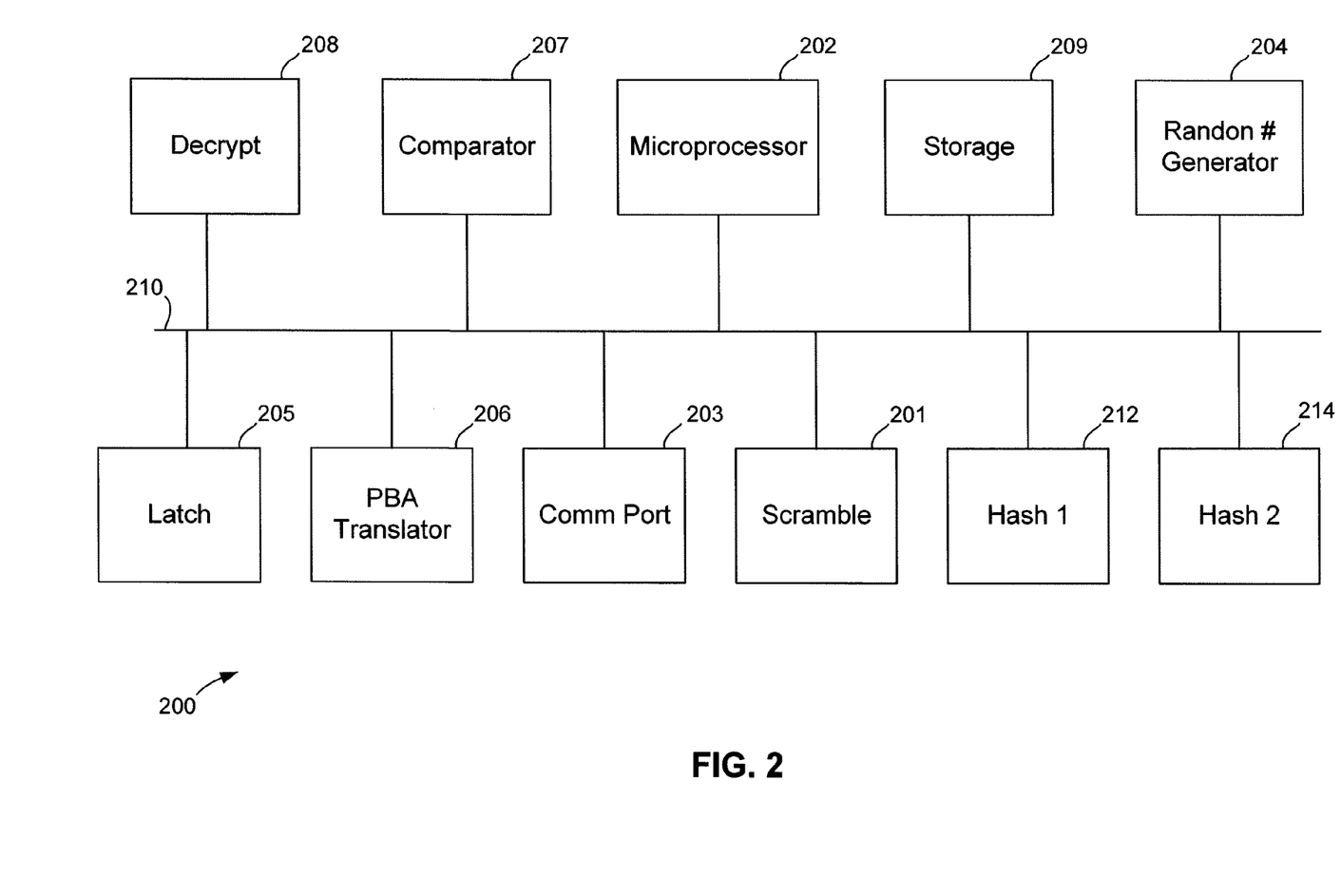
FIG. 2 is a schematic representation of a portable storage device in accordance with the present invention.

With reference to FIGS. 1 and 2, a system for providing security to a portable storage device includes a host system generally designated 100 and a portable storage device generally designated 200 which may be coupled to the host system 100. The host system 100 includes a central processing unit (CPU) 102 coupled to a bus 110. CPU 102 may be operable to control data flow between the host system 100 and the portable storage device 200 and to control encryption and decryption engines as further described herein. A computer interface unit 101 is coupled to the bus 110 and provides a means for entering an unencrypted user password under CPU control. This interface may include a keyboard, scanner, or finger print/eye pattern reader. A disk storage 104 is coupled to the bus 110 and provides local storage for the CPU instructions and holds data to be read/written to the portable storage device 200.

A first latch 103 is coupled to the bus 110 and provides a means for temporarily storing a random number generated by a portable storage device random number generator 204 under control of a portable storage device microprocessor 202 as further described herein. A first encryption engine 106 is coupled to the bus 110 and provides encryption of an unencrypted logical block address (LBA), an unencrypted password, and unencrypted data using the latched random number. A second encryption engine 109 is coupled to the bus 110 and provides encryption of the latched random number with a key to generate an encrypted random number. The key may be generated by the CPU 102 based on a portable storage device 200 serial number or other identifying information.

A first decryption engine 107 is coupled to the bus 110 and provides decryption of encrypted data received from the portable storage device 200 using the random number provided by a second decryption engine 108. The second decryption engine 108 is coupled to the bus 110 and provides decryption of the encrypted random number received from the portable storage device 200 using the key to regenerate the random number provided to the first decryption engine 107.

A host communication port 105 is coupled to the bus 110 and may include an interface such as a USB interface, a serial communication port interface, an Ethernet port interface and a wireless port interface. The host communication port 105 is used to communicate with a portable storage device communication port 203.

With particular reference to FIG. 2, the portable storage device microprocessor 202 is coupled to a bus 210. The random number generator 204 is also coupled to the bus 210 and provides the random number which is temporarily stored in a second latch 205 coupled to the bus 210. Random number generator 204 may be a pseudo-random number generator or use thermal noise as a source of true randomness. A storage medium 209 is coupled to the bus 210 and may include a flash memory. Storage medium 209 provides storage for the encrypted random number, the encrypted data, a hashed password as further described herein and a portable storage device serial number or other identifying information. Addressing into the storage medium 209 is by means of a Physical Block Address (PBA) provided by a PBA translator 206 which is coupled to the bus 210. Storage medium 209 may further include public and secure areas.

A portable storage device decryption engine 208 is coupled to the bus 210 and provides decryption of the encrypted password and the encrypted LBA. A first hash engine 212 is coupled to the bus 210 and provides a hashed password generated from a decrypted password. The hashed password is stored in the storage medium 209. A second hash engine 214 is coupled to the bus 210 and provides a hashed serial number. A scramble engine 216 is coupled to the bus 210 and generates an index from the unencrypted LBA and the hashed serial number. The PBA translator 206 translates the index into the PBA for the address to access the storage medium 209. A comparator 207 is coupled to the bus 210 and compares a hashed password with a previously stored hashed password as further described herein.

Figure 2A:
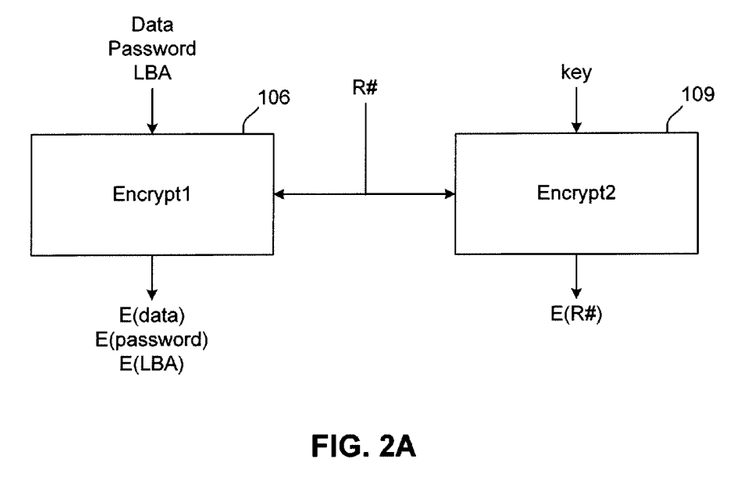
FIG. 2A is a schematic representation of host system encryption engines and their operations in accordance with the present invention.
Figure 2B:
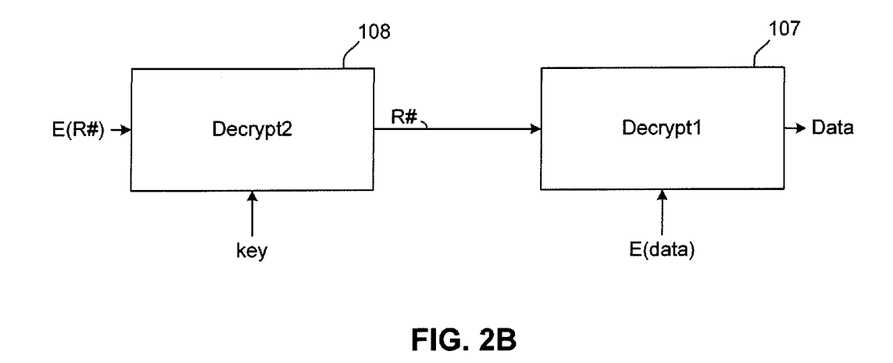
FIG. 2B is a schematic representation of host system decryption engines and their operations in accordance with the present invention.

FIGS. 2A and 2B illustrate the functionality of first and second encryption engines 106 and 109 and first and second decryption engines 107 and 108. With reference to FIG. 2A, the random number (R#) is used by the first encryption engine 106 to encrypt the LBA, the password and the data and generate an encrypted LBA, E(LBA), an encrypted password, E(password) and encrypted data, E(data). The second encryption engine 109 encrypts the random number using the key to generate the encrypted random number E(R#). With reference to FIG. 2B, the encrypted random number E(R#) is decrypted using the key by the second decryption engine 108. The decrypted random number is then used by the first decryption engine 107 to decrypt the encrypted data E(data).

Figure 3:
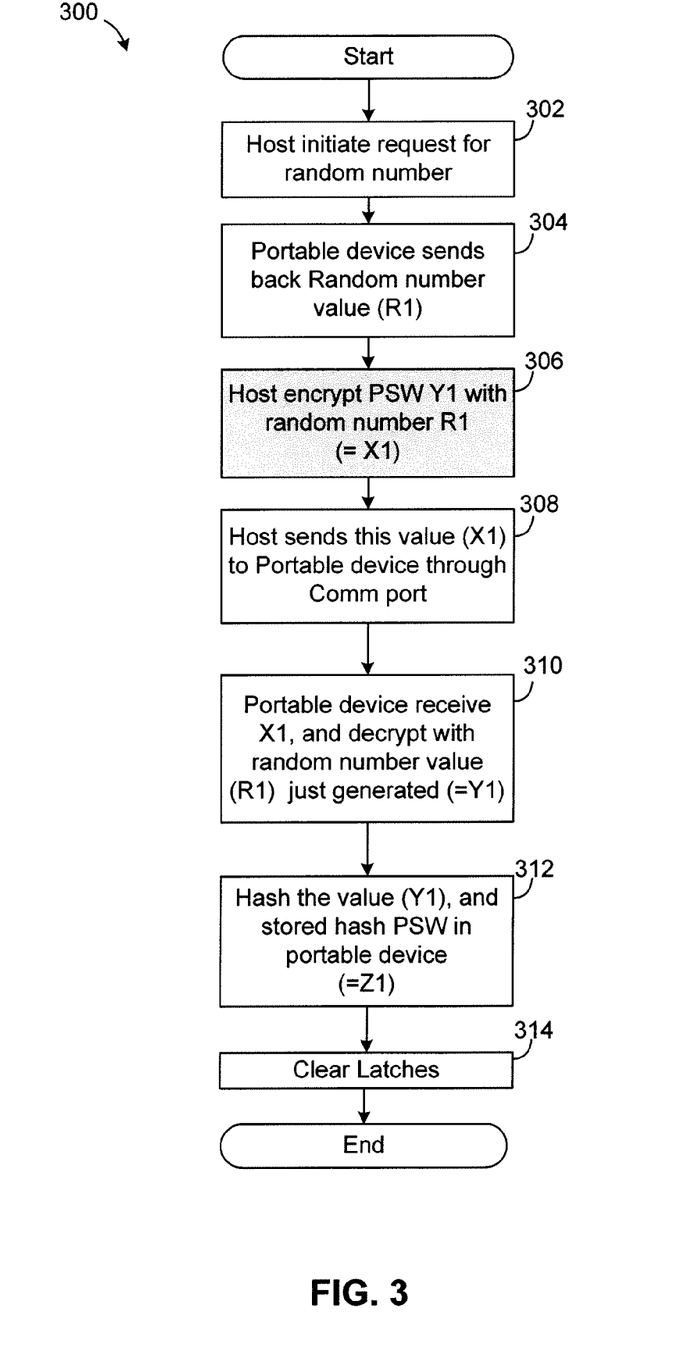
FIG. 3 is a flow diagram of a method for entering an original password for accessing the portable storage device in accordance with the present invention.

A hacker may gain possession of the portable storage device 200 and seek to have access to the information stored therein. In a case where the hacker has access to the host system 100 or to a machine having a similar configuration, password protection under CPU 102 control in accordance with the present invention provides security to the information. With reference to FIG. 3, a method generally designated 300 for entering an original password may include a step 302 in which the host system 100 may initiate a request for a random number from random number generator 204. In a step 304, the random number generated may be sent to the host system 100 and temporarily stored in the first latch 103. The random number may also be temporarily stored in the second latch 205. The received random number may be used to encrypt the original password (entered by a user through the interface unit 101) in the first encryption engine 106 in a step 306. In a step 308 the host system may send the encrypted password to the portable storage device 200 which may decrypt the sent encrypted password in a step 310 in the portable storage device decryption engine 208 using the random number stored in second latch 205. The decrypted password may then be hashed in the first hash engine 212 and stored in the secure area of the storage medium 209 as an initial hashed password in a step 312. The contents of the first latch 103 and of the second latch 205 may then be cleared in a step 314.

Figure 4:
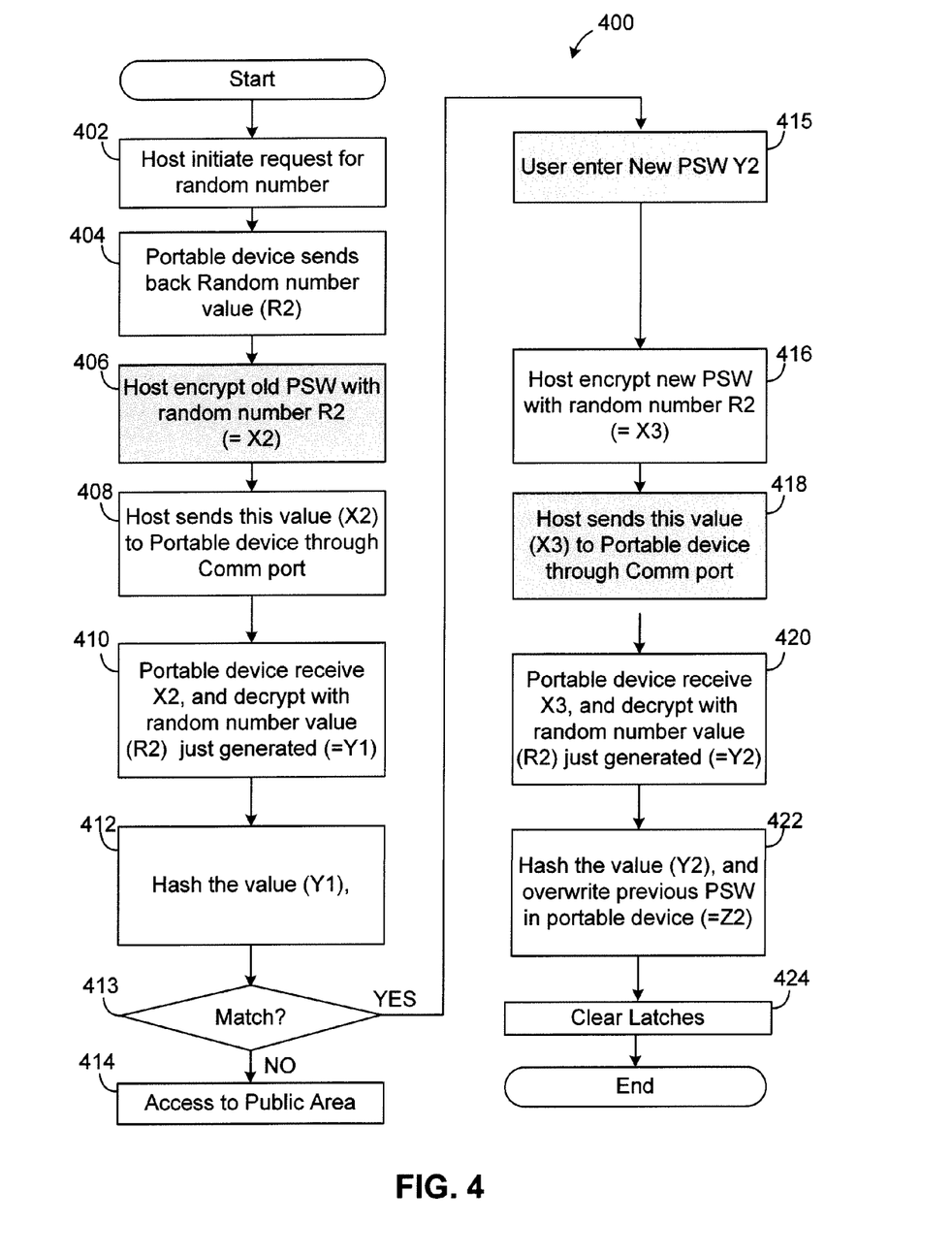
FIG. 4 is a flow diagram of a method for entering a new password for accessing the portable storage device in accordance with the present invention.

In accordance with another aspect of the invention, the user may enter a new password to replace the initial hashed password which has become stale. With reference to FIG. 4, a method generally designated 400 for entering a new password may include a step 402 in which the host system 100 may initiate a request for a random number from random number generator 204. In a step 404, a new random number generated will be sent to the host system 100 and temporarily stored in the first latch 103. The new random number may also be stored temporarily in the second latch 205 of the portable storage device 200. The new random number will be used to encrypt the original password (entered by the user through the interface unit 101) in the first encryption engine 106 in a step 406. In a step 408 the host system will send the encrypted password to the portable storage device 200 which will decrypt the sent encrypted password in the portable storage device decryption engine 208 using the new random number in a step 410. The decrypted password will then be hashed in the first hash engine 212 in a step 412 to generate a second hashed password. The second hashed password will then be compared to the first hashed password stored in the storage medium 209 in the comparator 207 in a step 413. If the first and second hashed passwords do not match, the user will only have access to the public area of the portable storage device 200 in a step 414. In alternative embodiments of the invention, the user may be given a plurality of opportunities to enter the original password to enable the user to correct any mistakes in the entry of the original password. Preferably the user is given three opportunities to enter the original password.

If the first and second hashed passwords match in step 413, then in a step 415 the user will enter a new password through the interface unit 101. Using the new random number, the host system 100 will encrypt the new password in the first encryption engine 106 in a step 416. In a step 418 the host system 100 will send the new encrypted password to the portable storage device 200. The received new encrypted password will be decrypted in the portable storage device decryption engine 208 using the new random number in a step 420. The decrypted new password will then be hashed in the first hash engine 212 to generate a new hashed password which will be used to overwrite the first hashed password in a step 422 and stored in the secure area of storage medium 209. The contents of the first latch 103 and of the second latch 205 may then be cleared in a step 424.

Figure 5:
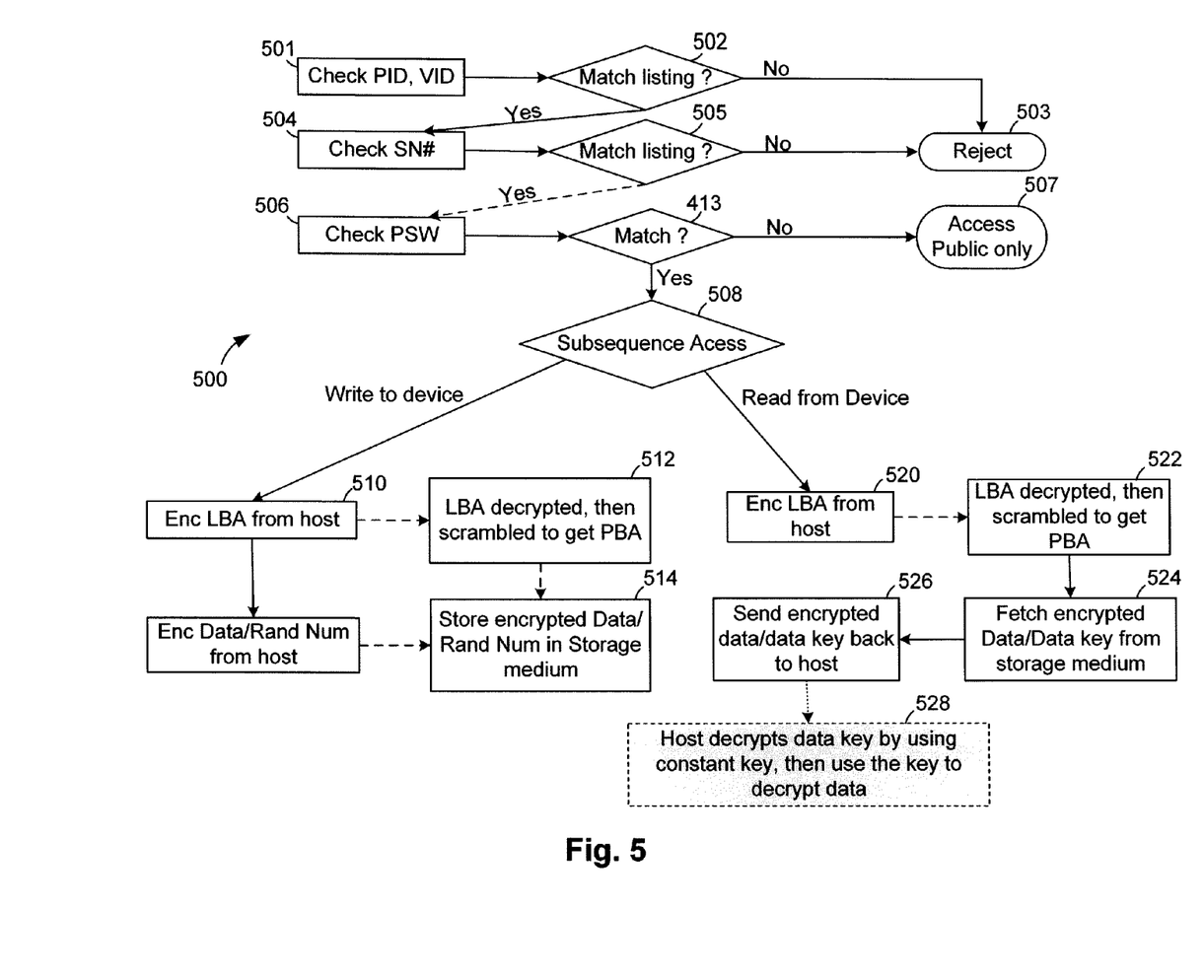
FIG. 5 is a flow diagram of a method for providing security to the portable storage device in accordance with the present invention.

Before verifying the user's password as provided for in method 400, additional security may be provided wherein the host system 100 checks the portable storage device's product identification, vendor identification and serial number against values stored in the host system 100. As shown in FIG. 5, a method of providing security to the portable storage device 200 generally designated 500 may include a step 501 in which the host system 100 requests the portable storage device's product identification number and vendor identification number. In a step 502 it is determined if the provided product identification number and vendor identification number match values stored in the host system 100. If the values don't match, then access to the portable storage device is rejected in a step 503. If the values do match, then in a step 504 the portable storage device's serial number is requested by the host system 100. In a step 505 it is determined if the provided serial number matches a value stored in the host system 100. If the values don't match, then access to the portable storage device is rejected in step 503. If the values do match, then in a step 506 the host system 100 checks a password entered by the user of the portable storage device 200 against the password stored in the portable storage device 200 in a step 506 by performing steps such as steps 402 through 413 of the method 400. If the password entered does not match the original password, then in a step 507 the user is granted access to the public area of the portable storage device 200. Alternatively, the password entered may be checked twice more before it is determined that the password entered does not match the original password. If the password entered does match the original password, then it may be determined whether write or read access to the portable storage device 200 is requested in a step 508.

If write access to the portable storage device 200 is requested, the random number generated in the password check is used to encrypt the LBA, data and the random number as shown in FIG. 2A. In a step 510 the host system 100 sends the encrypted LBA, encrypted data and encrypted random number to the portable storage device 200. In a step 512 the encrypted LBA may be decrypted by the portable storage device decryption engine 208 using the random number, scrambled by the scramble engine 216 to generate an index and translated by the PBA translator 206 to generate the PBA. The encrypted data and the encrypted random number may be stored in the secure area of the storage medium 209 in a step 514.

If read access to the portable storage device 200 is requested, the random number generated in the password check is used to encrypt the LBA. Then, in a step 520, the host system 100 sends the encrypted LBA to the portable storage device 200. In a step 522 the encrypted LBA is decrypted by portable storage device decryption engine 208 using the random number, scrambled by the scramble engine 216 to generate the index and translated by the PBA translator 206 to generate the PBA. The encrypted data and its associated encrypted random number are fetched from the storage medium 209 in a step 524. In a step 526 the encrypted data and the encrypted random number are sent to the host system 100. The host system 100 may decrypt the encrypted random number in decryption engine 108 using the key to generate the random number and decrypt the encrypted data in decryption engine 107 using the random number in a step 528.

In accordance with the invention, communication of information between communication ports 105 and 203 that can be used by a hacker to gain access to stored data, including the LBA, the password and the data itself, is encrypted. Thus a hacker monitoring communication bus traffic or using a bus monitor will not be able to gain access to the data.

Figure 6:
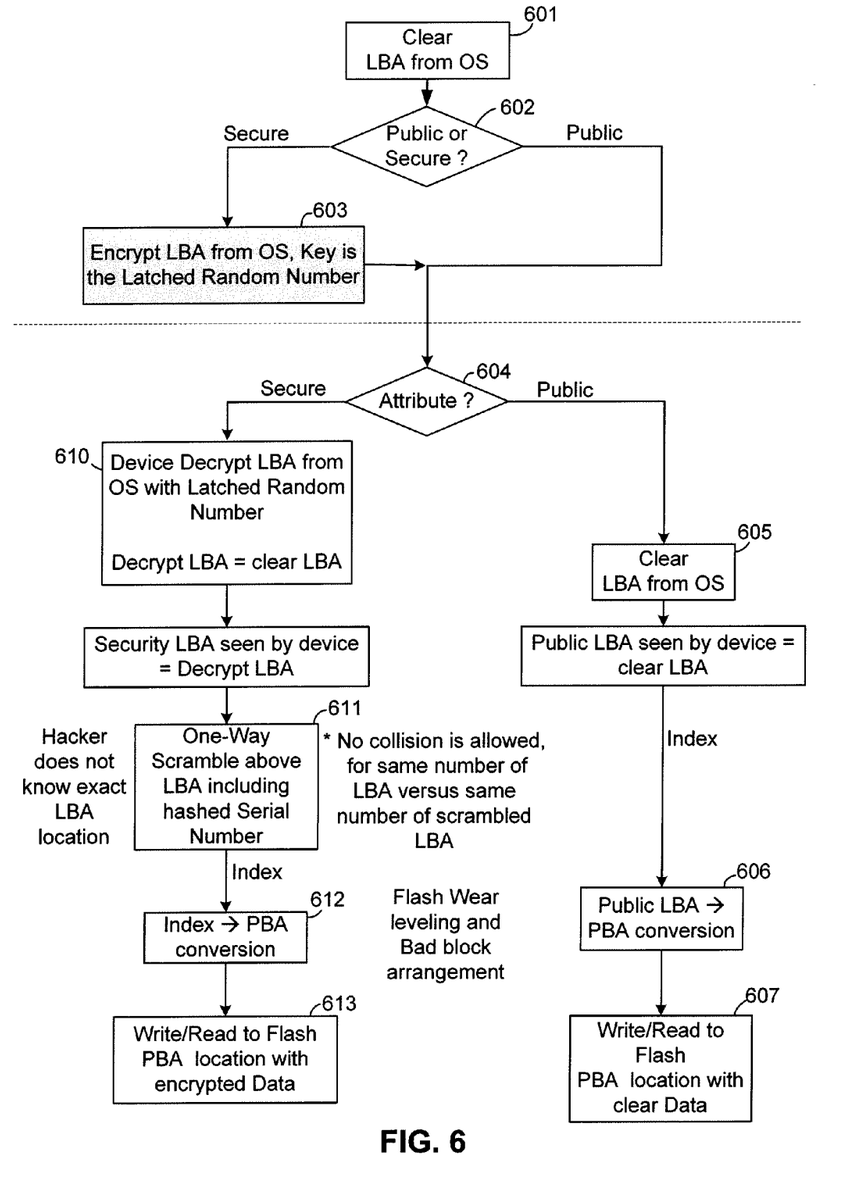
FIG. 6 is a flow diagram of a method for transforming an address in a public area and a secure area of the portable storage device in accordance with the present invention.

In accordance with another aspect of the invention, a method for determining an address transform generally designated 600 is shown in FIG. 6. In either a write access or a read access to the portable storage device 200, the LBA may be generated by the host system operating system in a step 601. In a step 602 it may be determined if the user has access to the public or secure area of the portable storage device 200. Step 602 may determine if the user has entered a valid password as described with respect to step 506 of the method 500. If the user has access to the secure area of the portable storage device 200, then the LBA may be encrypted using the random number generated by the random number generator 204 by the first encryption machine 106 in a step 603.

Figure 6A:
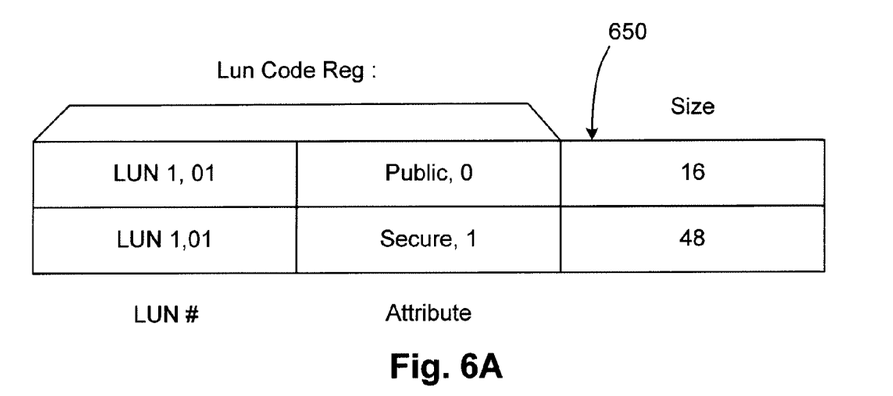
FIG. 6A is a schematic representation of a LUN Code Register.

In a step 604 a value of an attribute in a LUN Code Register 650 (FIG. 6A) may be determined. If the value is zero, then the access is to the public area of the portable storage device 200 and the LBA may be provided by the host system 100 to the portable storage device 200 in a step 605. In a step 606, the LBA may be used as an index to a public LBA-to-PBA conversion table generated at power up. Finally, in a step 607, write and read access of public data may be provided to the storage medium 209 using the PBA.

If the value determined in step 604 is one, then the access is to the secure area of the portable storage device 200 and the encrypted LBA generated in step 603 may be decrypted in the portable storage device decryption engine 208 in a step 610. In a step 611 the decrypted LBA may be scrambled with the hashed serial number in scramble machine 216. The scrambled LBA may then be used as an index to the PBA translator 206 in a step 612. Finally, in a step 613, write and read access of encrypted data may be provided to the storage medium 209 using the PBA.

Figure 7:
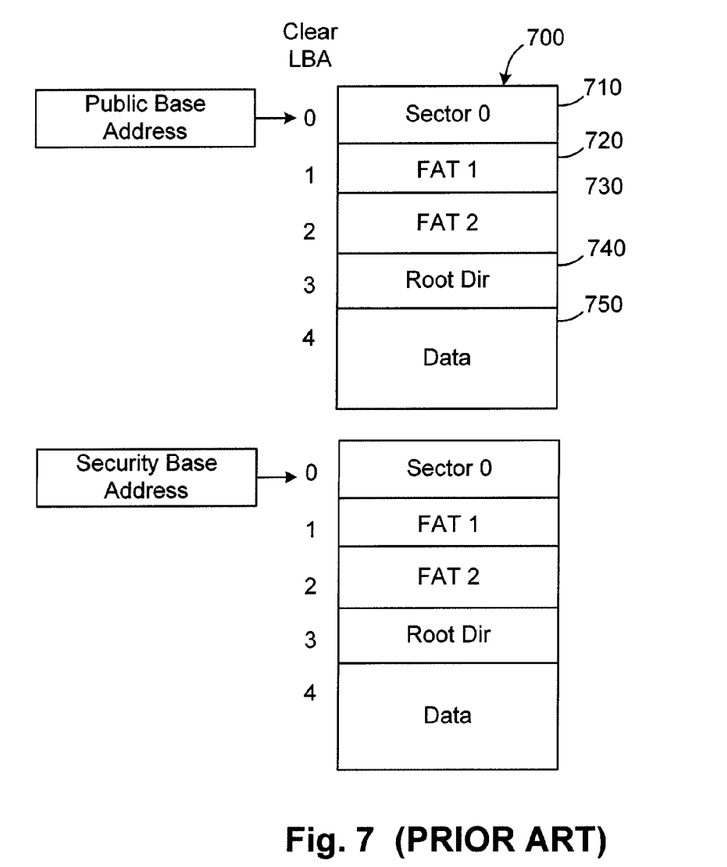
FIG. 7 is a schematic representation of a prior art FAT structure.

With reference to FIG. 7, there is shown a prior art FAT structure 700 for both public and secure areas of a portable storage device. Each FAT file system may include a Master Boot Block (MBB) 710 located at a sector 0, followed by FAT1 and FAT2 tables 720 and 730 respectively, a Root Directory 740 and Data 750. The FAT file system 700 may be a FAT16/32 or NTFS system.

Figure 8:
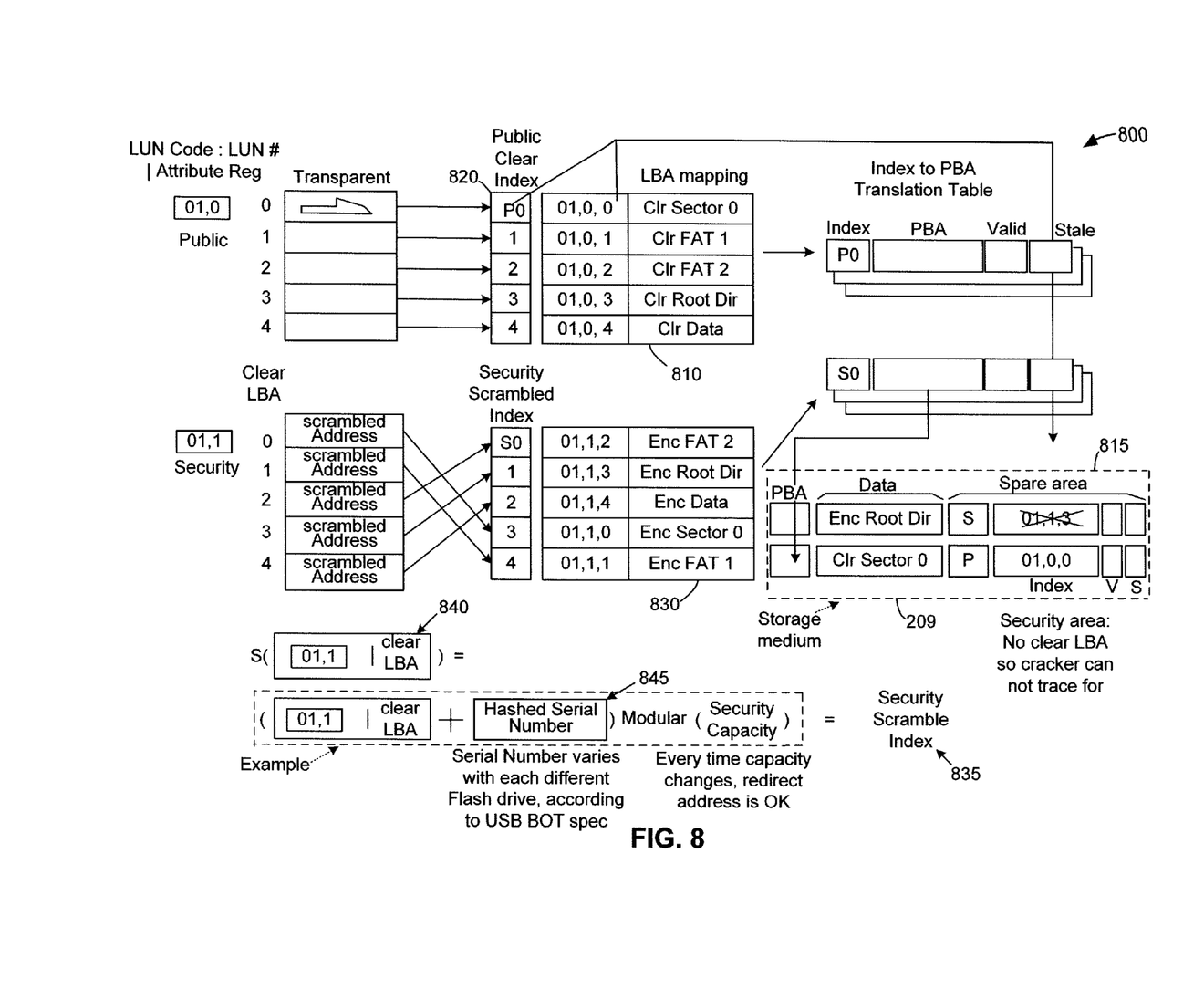
FIG. 8 is a schematic representation of an address transform in accordance with the present invention.

A system generally designated 800 for providing an address transform is shown in FIG. 8. For access to the public area of portable storage device 200, the LBA may be received from the host system without encryption. At power up, a public LBA-to-PBA translation table 810 may be built according to block information data in a spare area 815. The spare area 815 may contain information including LUN #, Valid, Stale and Public with the LBA or Secure with the scrambled LBA. The LBA may be used as an index 820 to the public LBA-to-PBA translation table 810 to generate the PBA.

For access to the secure area of the portable storage device 200, the encrypted LBA may be provided by the host system 100. At power up, a security index-to-PBA translation table 830 may be built according to the block information data in spare area 815. The encrypted LBA may be decrypted with the random number to the original LBA. As an example, a security scramble index 835 may be calculated using the LBA 840 and the hashed serial number 845. The security scramble index 835 may then be used to get the PBA for the storage medium 209 from security-to-PBA translation table 830.

Figure 9:
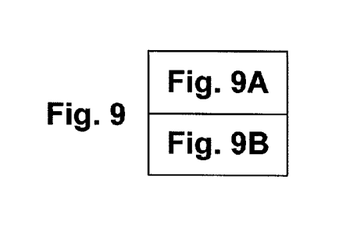
FIG. 9 is a schematic representation of a USB device in accordance with the present invention.
Figure 9A:
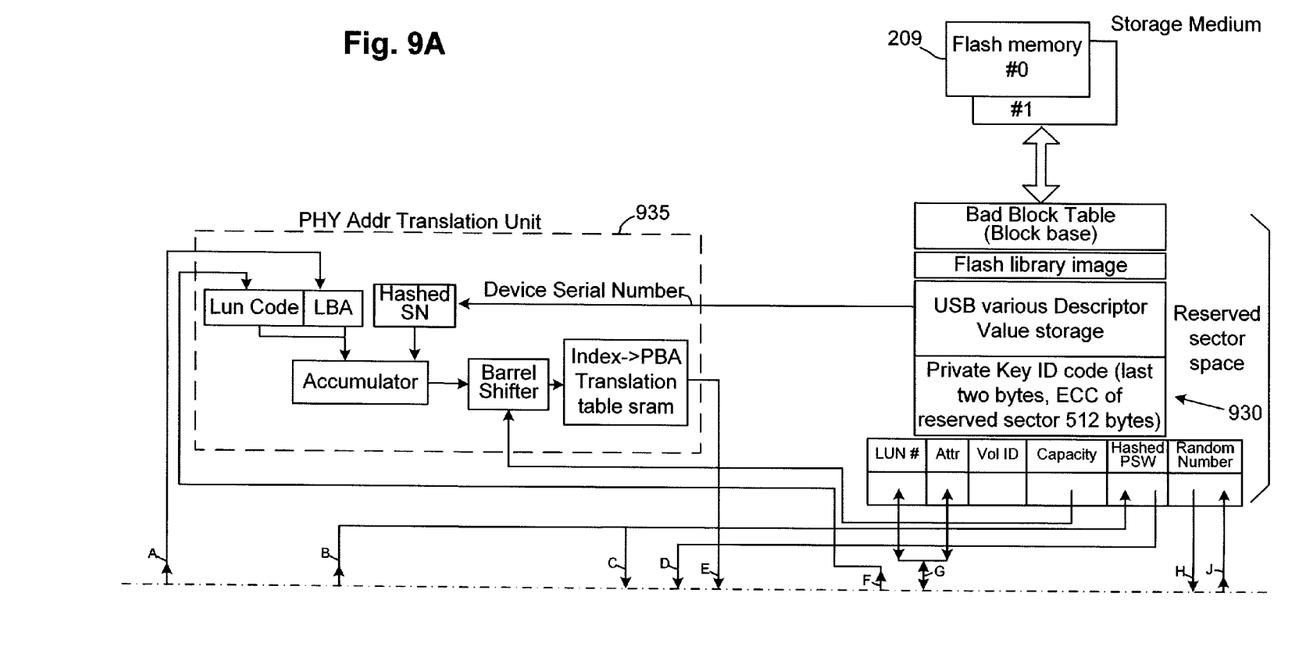
Figure 9B:
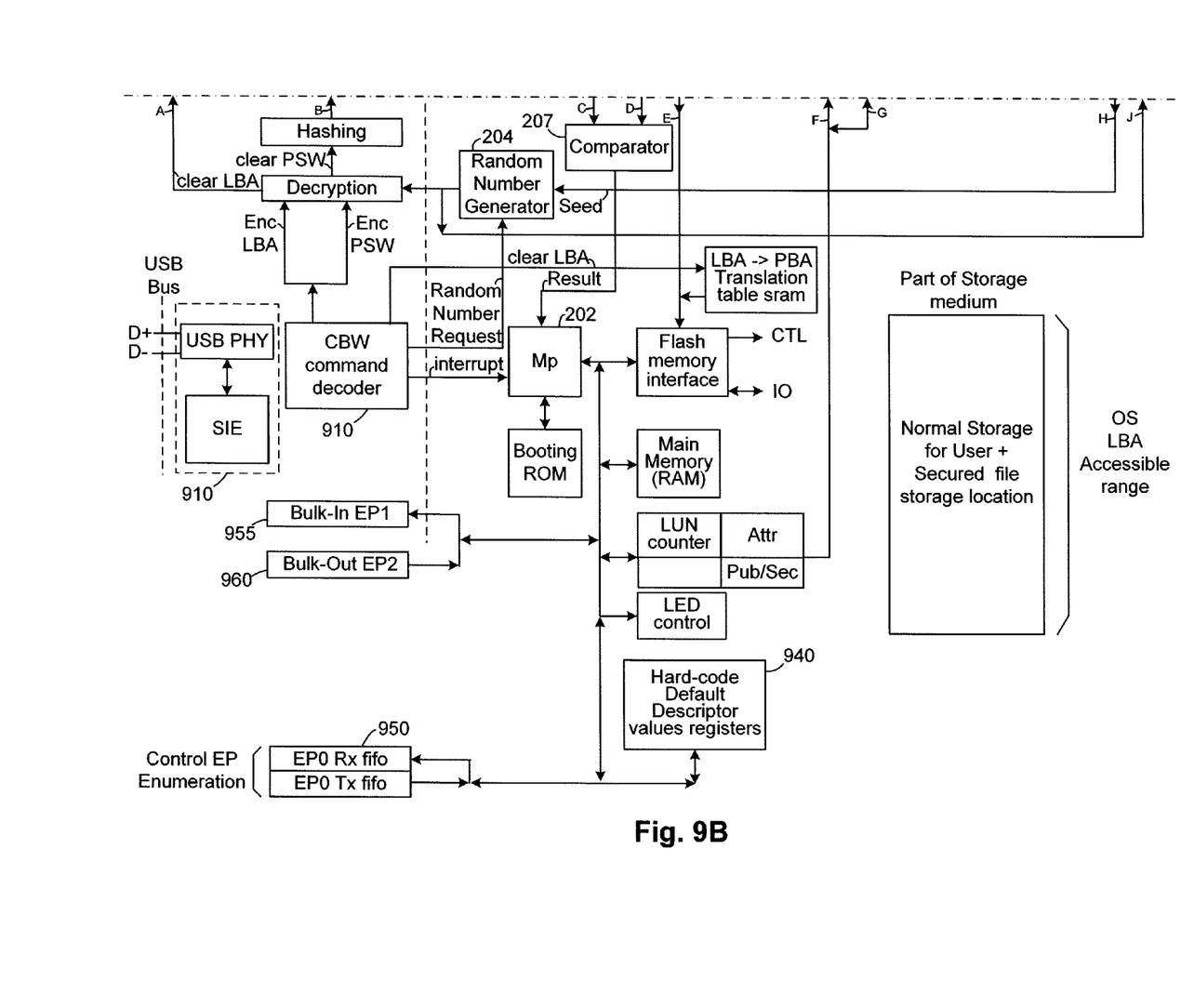

In accordance with one aspect of the invention, the system and method of the invention may be implemented in a USB device as shown in FIG. 9. LUN counter 650 may be capable of providing Public and Secure partition. Each partition can hold a different type of removable or fixed storage function, volume capacity and ID associated therewith.

A reserved sector of 512 bytes with pre-programmed control information and other non-volatile registers which holds capacity and partition information may be stored in a first available address space. This information is one time programmed by host drivers, and they are not changed frequently as disk data requires. Two copies of these storage spaces are preserved due to the erase-before-write nature of flash memory. First available flash memory block is reserved for this purpose. "Reserved space ratio" entry, entered by manufacture operator is used to determine the size of reserved space.

Address translation tables are implemented by volatile memory (SRAM) to keep track of where a valid copy of data is stored in storage medium 209. One table includes the LBA-to-PBA translation table 810, which is for the public area's PBA generation and the other table includes the index-to-PBA translation table 830, which is for the secure area's PBA generation. Logical block address (LBA) sent by Command Block Wrapper from the host system 100 for public area access will be used as an index to the LBA-to-PBA translation table 810 for storage medium 209.

The PBA address generation process is more complicated for the secure area. The encrypted LBA from the host system 100 may be decrypted to generate the LBA with a current available random number key. The LBA may be scrambled with the hashed serial number to generate a new index for Index-to PBA translation table 830. The resulting PBA will be used to access the storage medium 209.

Architecture of this innovation is based on Bulk-only-transport of Mass Storage Device, a Command Block Wrapper (CBW) with 31 bytes of control information sent by the host system 100. A CBW command decoder 910 may decode the CBW command and interrupt the portable storage device controller 202.

Random number generator 204, at power up or reset, may get the previously stored random number from a reserved sector 930 as a current seed random number. Upon receiving a random number request initiated by the host system 100, the random number generator 204 may generate a new random number based on the current random number.

The portable storage device decryption engine 208 may use the random number from the random number generator 204 as a key. If the access is for the secure area, the encrypted LBA will be restored to the LBA 840 (FIG. 8) and sent into a PHY address translation unit 935. The encrypted password may be restored to the entered password and sent to the first hash engine 212. Once the entered password has been hashed, it will be compared with the hashed password stored in the reserved sector 930. The result will be sent to the controller 920 for authentication.

PHY address translation unit 935 is an implementation example of how the scrambled index may be generated.

Hard-coded registers 940 may be used to respond to the host system 100 with default enumeration descriptors when the storage medium 209 is empty. If storage medium 209 is programmed already, the value stored will be sent back instead of a default value from the hard-coded registers 940.

Endpoint 0 950 may be dedicated for enumeration purposes, with packet size being programmed in a device descriptor field 7 for information transfer, and may be a 64 byte packet in this example.

Endpoint 1 955 may be a Bulk-in pipe for the host system 100 to read in information, and endpoint 2 960 may be a bulk-out pipe for the host system 100 to send data to the portable storage device 200. These two pipes can be 64 bytes in USB Version 1.1 spec and 512 bytes in the recent USB version 2.0 spec.

Figure 10:
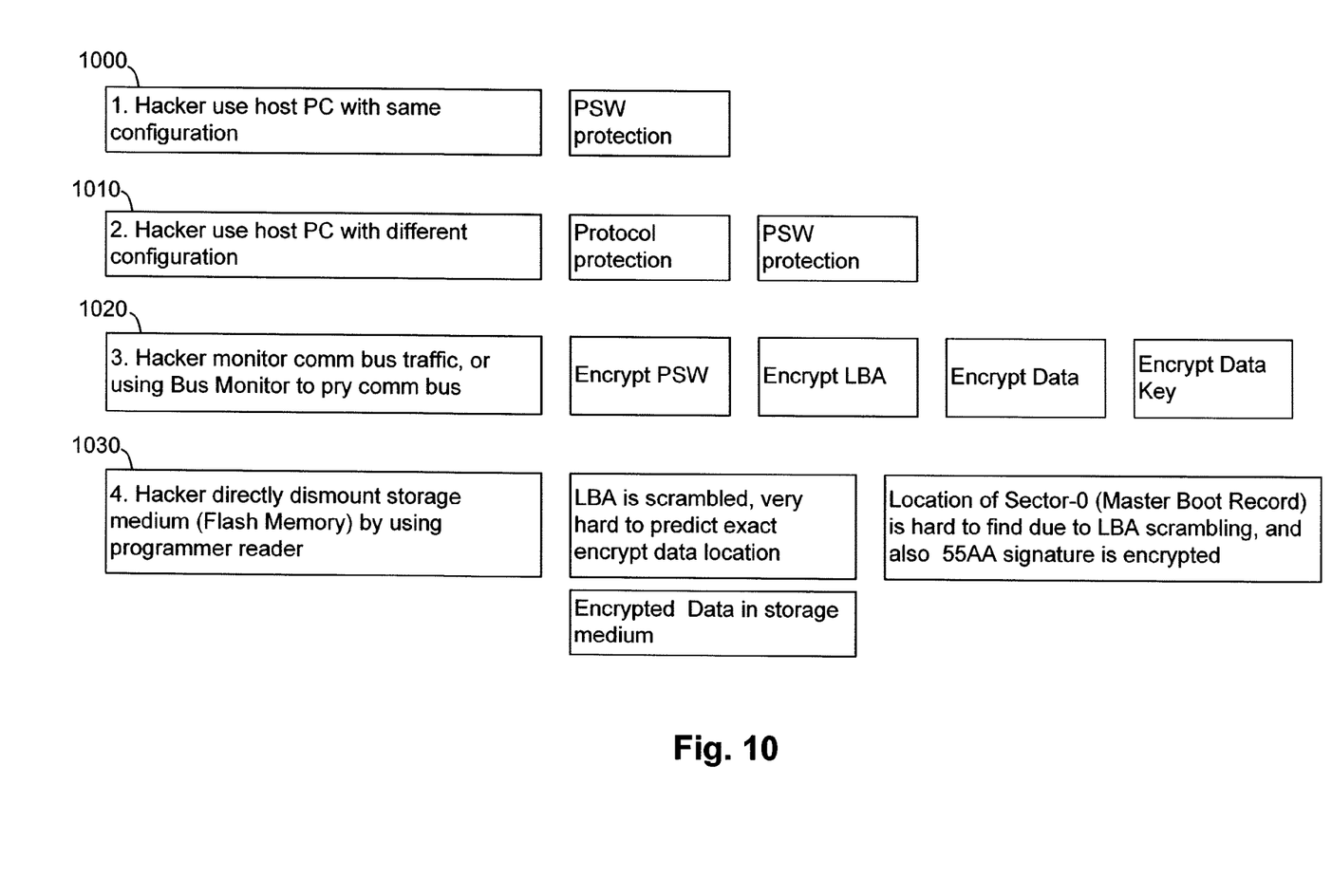
FIG. 10 is a chart summarizing various features of the present invention.

With reference to FIG. 10, there is shown a chart summarizing various features of the present invention. Various scenarios in which a hacker gains access to the portable storage device 200 are shown. In a first scenario 1000, the hacker may use the host system 100 but will not have access to the data stored in the portable storage device 200 due to password protection. In a second scenario 1010, the hacker may use a host system having a different configuration from the host system 100. The hacker will not be able to gain access to the data stored in the portable storage device 200 due to password protection and protocol protection.

In a third scenario 1020, the hacker may monitor bus traffic such as by using a bus monitor. The hacker will not be able to gain access to the data stored in the portable storage device 200 due to encryption of the password, encryption of the LBA, encryption of the data and encryption of the random number. In a fourth scenario 1030, the hacker may read the storage medium 209 using a reader. The hacker will not be able to gain access to the data stored in the portable storage device 200 due to the scrambled LBA, encryption of the data, the location of Sector 0 is hard to find due to LBA scrambling and 55AA signature encryption.

The many features and advantages of the invention are apparent from the detailed specification, and thus, it is intended by the appended claims to cover all such features and advantages which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

We claim:

1. A system comprising a portable storage device and a host system, said portable storage device being coupleable to said host system using a Universal Serial Bus (USB) interface such that a microprocessor disposed on the portable storage device is accessible by a central processing unit of the host system through the USB interface when the portable storage device is coupled to the host system, wherein said portable storage device includes a random number generator operable to generate a new random number each time the portable storage device is accessed by the host system;

wherein said host system includes an encryption engine operable to encrypt a password, a logical block address and data using the random number generated by the portable storage device, wherein said portable storage device includes a secure area for storing the encrypted password, encrypted logical block address and encrypted data, the host system encryption engine being further operable to encrypt the random number using a key to generate an encrypted random number, the encrypted random number being stored in the secure area of the portable storage device and associated with the encrypted data;

wherein said host system further includes a decryption engine operable to decrypt the encrypted random number using the key and to decrypt the encrypted data associated with the encrypted random number; and wherein said portable storage further includes a decryption engine operable to decrypt the encrypted password and the encrypted logical block address and to generate an encrypted password and an unencrypted logical block address.

2. The system of claim 1, wherein the random number generator uses thermal noise as a source of randomness.

3. The system of claim 1, wherein the random number generator comprises a pseudo-random number generator.

4. The system of claim 1, wherein said portable storage device further comprises a first hash engine operable to hash the unencrypted password.

5. The system of claim 1, wherein said portable storage device further comprises a second hash engine operable to hash a portable storage device serial number.

6. The system of claim 5, wherein said portable storage device further comprises a scramble engine operable to generate an index from the unencrypted logical block address and the hashed serial number.

7. The system of claim 6, wherein said portable storage device further comprises a physical block address translator operable to translate the index into the physical block address.

8. The system of claim 1, wherein said portable storage device further comprises a comparator operable to compare hashed passwords.

9. A method for providing security to a portable storage device coupleable to a host system using a Universal Serial Bus (USB) interface such that a microprocessor disposed on the portable storage device is accessible by a central processing unit of the host system through the USB interface when the portable storage device is coupled to the host system, the method comprising the steps of:

receiving in the host system a random number generated by the portable storage device each time the portable storage device is accessed by the host system, wherein the portable storage device includes a random number generator that generates a new said random number each time the portable storage device is accessed by the host system;

encrypting a user password using the random number in the host system;

sending the encrypted password to the portable storage device;

decrypting the encrypted password using the random number, wherein said decrypting is performed by a decryption engine disposed on the portable storage device;

hashing the decrypted password in the portable storage device, wherein said hashing is performed by a hash engine disposed on the portable storage device;

comparing the hashed password to a hashed password stored in the portable storage device, wherein said comparing is performed by a comparator disposed on the portable storage device; and allowing access to a secure area of the portable storage device in the case where the hashed password is the same as the stored hashed password.

10. The method of claim 9, further comprising encrypting a logical branch address and data using the random number in the host system and sending the encrypted logical branch address and the encrypted data to the portable storage device.

11. The method of claim 10, further comprising decrypting the encrypted logical branch address and scrambling the decrypted logical branch address to generate a physical branch address to which the encrypted data and encrypted random number are written, wherein said decrypting and scrambling are performed by associated engines disposed on the portable storage device.

12. The method of claim 10, further comprising decrypting the encrypted logical branch address and scrambling the decrypted logical branch address to generate a physical branch address from which the encrypted data and the encrypted random number are read, wherein said decrypting and scrambling are performed by associated engines disposed on the portable storage device.

13. The method of claim 9, further comprising erasing the random number from the host system following the host system user password encryption step.

14. A method for providing security to a portable storage device coupleable to a host system using a Universal Serial Bus (USB) interface such that a microprocessor disposed on the portable storage device is accessible by a central processing unit of the host system through the USB interface when the portable storage device is coupled to the host system, the method comprising the steps of:

generating a random number in the portable storage device each time the portable storage device is accessed by the host system, wherein the portable storage device includes a random number generator that generates a new said random number each time the portable storage device is accessed by the host system;

providing the generated random number to the host system;

encrypting a password, a logical block address and data using the random number in the host system;

providing the encrypted password, encrypted logical block address and encrypted data to the portable storage device;

storing the encrypted password, encrypted logical block address and encrypted data in a secure area of the portable storage device;

encrypting the random number using a key to generate an encrypted random number in the host system;

providing the encrypted random number to the portable storage device;

storing the encrypted random number in the secure area of the portable storage device; and associating the encrypted random number with the stored encrypted data.

15. The method of claim 14, further comprising decrypting the encrypted random number using the key and decrypting the encrypted data associated with the encrypted random number using the decrypted random number in the host system.

16. The method of claim 14, further comprising decrypting the encrypted logical branch address and scrambling the logical branch address to generate a physical branch address in the portable storage device.

17. The method of claim 16, further comprising writing the encrypted data to the physical branch address.

18. The method of claim 16, further comprising reading the encrypted data from the physical branch address.

19. The method of claim 14, further comprising erasing the random number from the host system following the host system encryption steps.

20. The method of claim 14, wherein the random number is generated using thermal noise as a source of randomness.

* * * * *